J. G. GALLET.
Traction Wheels.
No. 139,711. Patented June 10, 1873.
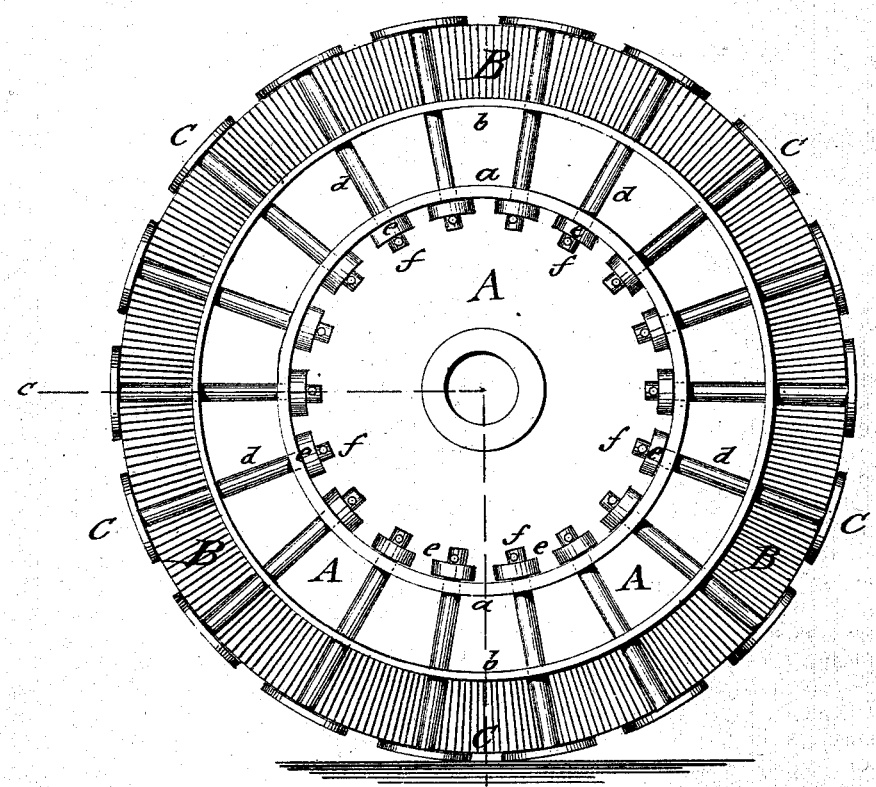
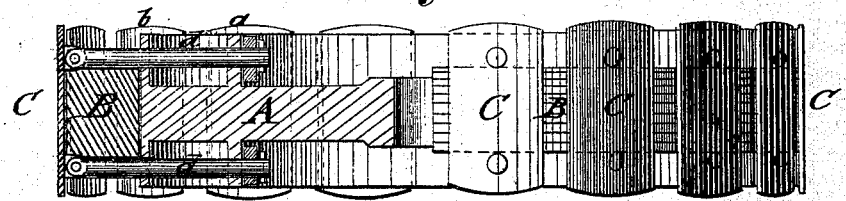
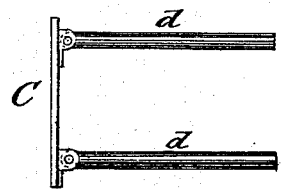
Witnesses:
Inventor:

UNITED STATES PATENT OFFICE.

JOHN G. GALLET, OF ST. AUGUSTINE, ILLINOIS.

IMPROVEMENT IN TRACTION-WHEELS.

Specification forming part of Letters Patent No. 139,711, dated June 10, 1873; application filed March 8, 1873.

*To all whom it may concern:*

Be it known that I, JOHN G. GALLET, of St. Augustine, in the county of Knox and State of Illinois, have invented a new and useful Improvement in Elastic Wheel for Road-Steamers, of which the following is a specification:

In the accompanying drawing, Figure 1 is a side elevation of my improved elastic wheel. Fig. 2 is a side view of the same, partly in section, on the line *c c*, Fig. 1; and Fig. 3 shows hinge-connection of guard-plate with side bolts.

Similar letters of reference indicate corresponding parts.

The invention consists in the improvement of means for holding the rubber sections of a tire on the wheel, so that they will be held securely and yet be easily detachable.

In the drawing, A is the solid plate or spoke-wheel, of suitable metal, being provided with two projecting rims, *a* and *b*. The outer rim, *b*, may be flanged to keep the rubber in place. The rubber tire B may be of two or more pieces, placed around the periphery of the wheel. Any part of tire B may easily be replaced, if it should be required. Rubber tire B is firmly sustained on the wheels by guard-plates C, which are arranged at suitable distances from each other. Plates C, of rectangular shape, have applied, perpendicularly to them and in the radial direction of the wheel, side bolts *d*, which pass through suitable holes in rims *a* and *b*, and are firmly secured to the latter by means of metal and rubber washers *e* and pins or nuts *f*. The side bolts *d* may also be hinged to plate C, or connected by ball-and-socket arrangement, so that the wheel may pass projecting objects on the road by a slight upward inclination of the guard-plates, Fig. 3.

A less expensive construction of the guard-plates C would be to make them of one piece with tapering sides, which are bent under right angles and pass through slots in the rims, similarly secured by washers and pins.

By tightening the bolts *d* in the slots or holes in rim *b* the rubber tire will curve out slightly between the interstices of the guard-plates, forming, instead of a polygonal, an almost circular, periphery, avoiding thereby, in connection with the elastic washers, the noisy concussion of the old wheels. The breaking strain of the rubber tire is, by means of the strong support of the guard-plates, obviated, and the elastic material applied so as to give bearing-surface and spring-action against concussion.

Having thus described my invention, I claim as new and desire to secure by Letters Patent—

The combination, on a solid plate, A, of two rims, *a b*, the plates C, hinged bolts *d*, elastic washers *e*, and pins *f*, to hold the sectional rubber blocks of a wheel-tire, in the manner described.

JOHN G. GALLET.

Witnesses:
W. H. GILLASPIE,
J. H. COOPER.